Aug. 9, 1932.    J. S. PARSONS    1,870,784
ALTERNATING CURRENT DISTRIBUTION SYSTEM
Filed Jan. 5, 1929
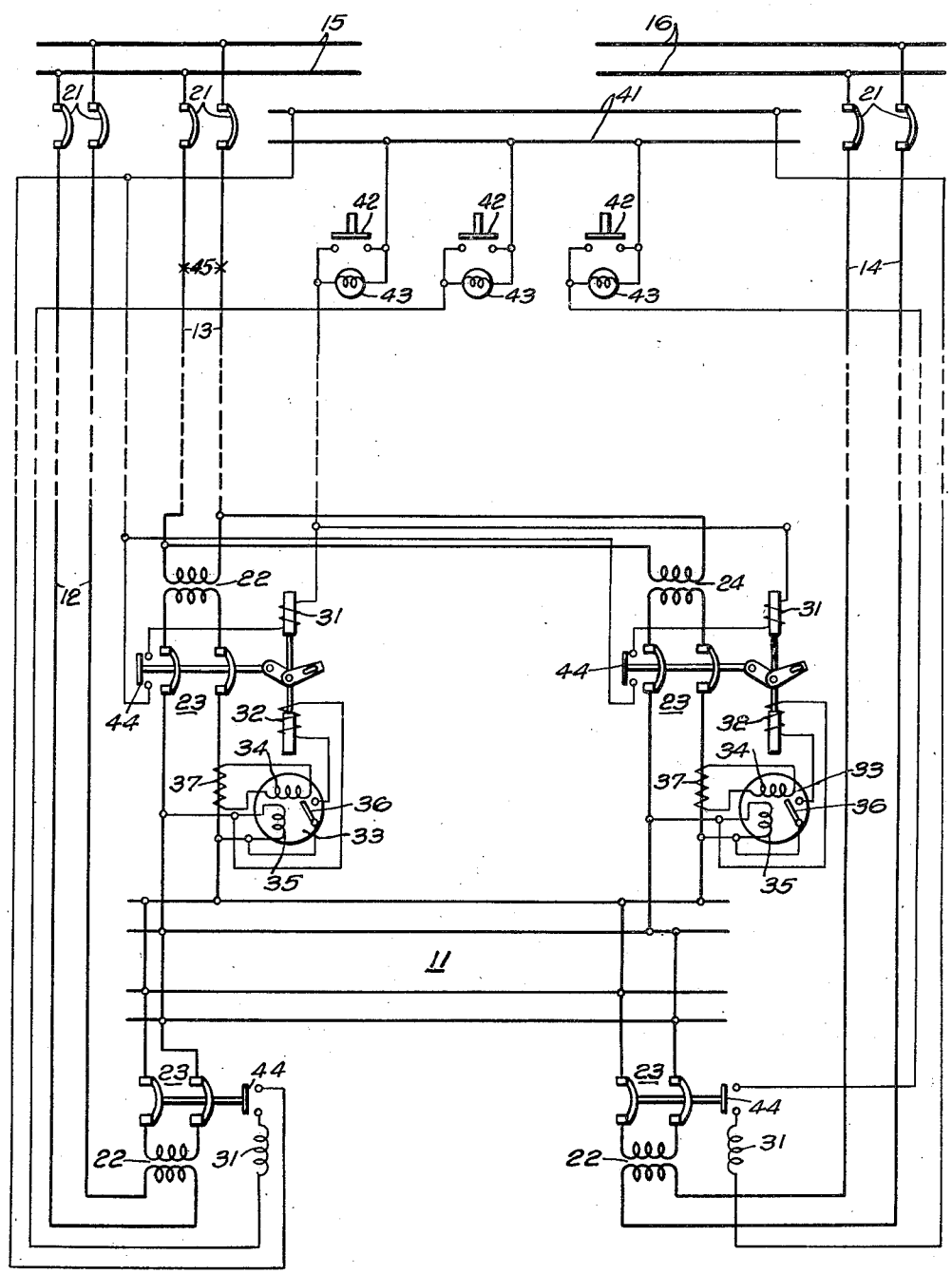
INVENTOR
John S. Parsons.
BY
ATTORNEY Patented Aug. 9, 1932

1,870,784

UNITED STATES PATENT OFFICE

JOHN S. PARSONS, OF EAST ORANGE, NEW JERSEY, ASSIGNOR TO WESTINGHOUSE ELECTRIC & MANUFACTURING COMPANY, A CORPORATION OF PENNSYLVANIA

ALTERNATING CURRENT DISTRIBUTION SYSTEM

Application filed January 5, 1929. Serial No. 330,521.

This invention relates to alternating-current distribution systems and particularly to systems utilizing a pilot wire and a sensitive reverse-current relay for controlling a low-voltage distribution network.

One object of my invention is to provide a simplified system of control for a network interrupter in which the closing function may be controlled by means of a pilot-wire circuit, and the opening function may be controlled by a simple reverse-current or reverse-energy relay or other means responsive to the magnitude and phase position of the current traversing the associated interrupter when it is closed.

A further object of my invention is the provision of a network control system which facilitates the synchronizing of the various sources of energy of the network.

Network distribution systems of the type to which my invention is applicable usually comprise a network load circuit energized from a plurality of sources or stations through step-down distribution transformers. A high-tension interrupter is disposed in each feeder between the transformer and the source, and, preferably, is located at the source, and network switches are disposed in the feeders between the transformer and the network.

In accordance with the present invention, I provide reverse-energy relays for controlling the opening of the respective network switches in response to a reversal of power in the respective feeders, and a pilot-wire circuit for closing the network switches.

A better understanding of the invention may be had by reference to the single figure of the drawing which is a diagrammatic representation of a network distribution system embodying my invention.

Referring to the drawing, a low-voltage network or load circuit 11 is illustrated as being supplied or energized by the feeders 12, 13 and 14, which, in turn, are connected to supply busses 15 and 16, which may be located at a generating station. The feeders may all be connected to a single bus, if desired, or, as shown, to a plurality of busses connected to independent generators.

Each feeder, for example, feeder 13, may be provided with a high-tension circuit interrupter 21 preferably located adjacent to the bus 15, a distribution transformer 22 for stepping down the voltage of the high-tension supply bus 15 to a low voltage suitable for the network 11, and between each transformer 22 and the network 11 is disposed a network switch or network interrupter 23. The control means for the circuit interrupter 23 constitutes the special feature of this invention and will be described in detail hereinafter.

Since the high-tension circuit interrupters 21, the distribution transformers 22 and other equipment associated with the feeders 12 and 14 may be identical with that associated with the feeder 13, only the apparatus associated with the feeder 13 will be described in detail.

Furthermore, each feeder circuit may have associated therewith a single distribution transformer 22, as shown, with respect to feeders 12 and 14, or each feeder circuit may have a plurality of such transformers as, for example, the transformers 22 and 24 associated with the feeder 13. In every case, however, between each of the distribution transformers 22 and 24 and the network 11 will be provided a network interrupter 23 and network-interrupter-control means.

The network-interrupter-control means, in the modification illustrated, comprises independent closing and tripping means which include the closing coil 31 and a tripping coil 32 of the shunt-trip type controlled by relay apparatus 33 which may be a simple reverse-energy relay having a current winding 34 and a voltage winding 35 and a switch or contact member 36. The relay is, preferably, of the inductive type and is sensitive to relatively low reverse-current values, such as the magnetizing current and the charging current of the transformers and feeders.

The current winding 34 of the relay is connected to a current transformer 37, connected in the feeder circuit, which may be of the saturable type in order to limit the values of current traversing the current winding 34. The voltage winding 35 is preferably connected across the feeder conductors, as shown, and is energized, therefore, in accordance with the network voltage.

The current winding 34 and the voltage winding 35 cooperate to control the reverse-energy relay 33 to close the contact members 36 only when energy traverses the feeder, to which it is connected, in a direction from the network 11 toward the transformer 22.

The tripping coil 32 of the network interrupter 23 is preferably energized, as shown, from the network voltage in order to simplify the system and eliminate the use of storage batteries which may otherwise be necessary.

The closing operation of each network interrupter, as, for example, the interrupter 23 associated with the feeder 13, is controlled by a pilot-wire circuit which may be energized by an independent source of power, such as the source 41. The pilot-wire circuit includes a control switch 42, an indicating lamp 43, the interrupter-closing coil 31, and a pallet or auxiliary switch 44 for opening the closing-coil circuit when the interrupter 23 is in the closed position thereof. The purpose of the indicating lamp 43 is to afford an indication as to whether the associated network interrupter 23 is open or closed.

In operation, assuming that the bus bars 15 are normally energized, that the circuit interrupters 21 are in open position and that the network 11 is de-energized or dead, if the station operator closes the high-tension circuit interrupter 21 associated with any of the feeders 12, 13 and 14, and also closes the associated pilot-wire control switches 42, the corresponding network switches 23 will automatically be closed and thereby energize the network.

Assuming, however, that the network is already energized, for example, by the feeders 12 and 14, and it is desired to connect the feeder 13 into service, the interrupter 21 and control switch 42 thereof may be closed to thereby energize the closing coil 31 of the network switch. The closure of the network switch opens the pallet switch 44 to break the pilot-wire circuit and thereby de-energize the indicating lamp 43.

If, for any reason, the transformer 22 associated with the feeder 13 is not in energy-delivering condition relative to the network 11, that is, if the voltage and phase conditions of the supply bus 15 and the network load circuit are such as to cause a flow of energy from the network to the distribution transformer 22, the relay 33 will close the contacts 36 thereof and energize the trip coil 32 of the interrupter.

However, if the transformer 22 is in energy-delivering condition relative to the network 11, the interrupter 23 will remain closed under normal conditions, and an indication of whether the interrupter 23 is in open or closed position will be afforded by the indicating lamps 43. Therefore, the operator can, at a glance, note the condition of the remote network interrupter 23 and close it at will by closing the control switch 42.

In the opening function of the switch 23, assuming that a fault, such as the fault 45, should occur relative to the high-tension feeder 13 or relative to the transformer 22, or, in fact, anywhere between the interrupters 21 and 23 of the feeder 13, such fault will cause a reverse current of substantial magnitude to flow thereto from the network, and such reverse current will cause the network relay 33 to trip the interrupter 23 and thereby disconnect the network from the faulty feeder 13. Likewise, the interrupter 21 will be opened by reason of an excess current, assuming the interrupter 21 is equipped with some usual form of automatic excess-current tripping device. Therefore, a high-tension fault will operate to immediately disconnect the faulty feeder from both the supply source 15 and the network 11.

In the case of faults on the low-tension side of the network switch 23, such as short circuits on the network, the network switch will not operate since there is no reversal of power in the feeders, and the high-tension breakers 21 will not open in response to overload because of the impedance of the distribution transformers in the feeder. Faults on the network are, therefore, permitted to burn clear in accordance with usual practice.

It may be observed that the closing of the network switches 23 may be controlled from a remote point by means of the control switches 42, and this control may be effected irrespective of whether the high-tension interrupters 21 are open or closed. This feature is of importance if it is desired to synchronize two independent sources, such as the busses 15 and 16, through the network.

It is apparent, in this regard, that the synchronizing of two independent sources through a plurality of circuit-interrupters in parallel, such as the interrupters 21 and 23, would be very difficult, if not impossible.

In accomplishing this synchronization, therefore, the network switches 23, associated with the various sources, may be closed by the control switches 42, and the synchronizing may then be accomplished through the high-tension interrupters 21, in a usual manner, by means of a synchroscope or the like.

It may be observed, further, that the network switches 23 may be opened by the station operator by opening the high-tension breakers 21. In this operation, when the high-tension breaker is opened, the associated transformer will be energized from the network, and the reversal of power in the feeder will cause the operation of the relay 33 to actuate the network switch 23.

One of the problems in network distribution systems of the type where the network switch is controlled automatically in both the closing and opening operations, is the provision of means for preventing repeated opening and closing of the switch when the conditions on the feeder are not such as to maintain the switch closed. This undesirable operation, usually termed "pumping", is avoided in the present invention because, when the station operator closes the control switch 42 to close the network switch 23, and the switch immediately reopens in response to the operation of relay 33, the operator is apprised of this operation by the illumination of the indicating lamp 43 and will not again operate the control switch 42 until he has corrected the abnormal condition.

In accordance with my invention, therefore, I have provided a control means for the network switches of a low-voltage distribution system, whereby the switches may be manually controlled, in both their opening and closing functions, by an operator by manipulation of the high-tension interrupters 21 and control switches 42, respectively, and the network switches may be opened automatically by means of reverse-current relays of a usual type in response to a reverse-current condition in the respective feeders.

Further, the manually controlled closure of the network switches may be effected without regard to whether the high-tension interrupter is opened or closed, and this arrangement is of importance in that it greatly facilitates the synchronizing of independent sources to be connected to the network.

Although the system described and shown is single phase, the invention is obviously applicable to an alternating-current system having any number of phases, and is particularly useful where extreme simplicity is desired. Two pilot wires are illustrated as connected between the control switch 42 and the closing coil 31, but, obviously, a ground return might be used in place of one of the pilot wires. Further, if desired, the manual switches 42 may constitute pallet switches operated by the respective high-tension interrupters 21 so that, upon closure of an interrupter, the pilot-wire circuit, including the closing coil 31 of the network switch, will be completed to effect the closure of the switch. Also, the tripping coil 32 of the network interrupter 23, though shown as the shunt-trip type, may obviously be of some other type, such as low-voltage trip.

Such changes and modifications as may be made by those skilled in the art are to be construed as within the scope of the appended claims, except as limitations may be imposed by the prior art.

I claim as my invention:

1. In an alternating-current system of distribution comprising a network load circuit energized from a plurality of different sources from a central station through feeder circuits, each feeder including a step-down transformer, an interrupter disposed between the transformer and source and a network switch disposed between the transformer and network; means for opening said network switch when said interrupter is opened including a directional relay energized from said associated feeder for opening the network switch on the occurrence of energy flow from the network, and means controlled from a point adjacent to said interrupter for closing said network switch, whereby an operator may control both the opening and closing of said network switch from said station.

2. In an alternating-current system of distribution comprising a network load circuit energized from a plurality of different sources through feeder circuits, each feeder including a step-down transformer, an interrupter disposed between the transformer and source and a network switch disposed between the transformer and network; means for opening said network switch upon the occurrence of a predetermined magnitude of current flow therethrough from said network, including a directional relay energized from said associated feeder for opening the network switch on the occurrence of energy flow from the network, and means controlled from a point adjacent to said interrupter for closing said network switch, whereby an operator may control the closing of said network switch when said interrupter is open for affecting the proper synchronizing of the different sources through the network.

3. An alternating current system of distribution comprising a network load circuit, a plurality of different sources and feeders associated therewith including step-down transformers for energizing said network interrupters disposed between said sources and said transformers, network switches in said feeders between said transformers and said network, directional relays energized from the network side of said switches, respectively, for opening said switches, and means controlled from a remote point for closing said switches, whereby an operator may control both the opening and closing of said switches at the respective sources.

4. In an alternating-current system of distribution comprising a network load circuit energized from a plurality of different sources from a central station through feeder circuits, each feeder including a step-down transformer, an interrupter disposed between the transformer and source and a network switch disposed between the transformer and network; means for opening said network switch when said interrupter is opened including a directional relay energized from said associated feeder on the network side of said switch for opening the network switch on the occurrence of energy flow from the network, and means controlled from a point adjacent to said interrupter for closing said network switch, whereby an operator may control both the opening and closing of said network switch from said station.

In testimony whereof, I have hereunto subscribed my name this 28th day of Dec., 1928.

JOHN S. PARSONS.